United States Patent
Ikeda

(10) Patent No.: US 7,071,658 B2
(45) Date of Patent: Jul. 4, 2006

(54) PROTECTION OF A GENERATOR WITHOUT MEASURING TEMPERATURE

(75) Inventor: Sadafumi Ikeda, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 271 days.

(21) Appl. No.: 10/216,247

(22) Filed: Aug. 12, 2002

(65) Prior Publication Data

US 2003/0042876 A1    Mar. 6, 2003

(30) Foreign Application Priority Data

Sep. 6, 2001    (JP)    ............... 2001-270513

(51) Int. Cl.
   *H02H 7/06*    (2006.01)
   *H02P 11/00*    (2006.01)
   *H02P 9/00*    (2006.01)

(52) U.S. Cl. ...................................... 322/37
(58) Field of Classification Search .............. 322/37, 322/46; 290/40 C
See application file for complete search history.

(56) References Cited

U.S. PATENT DOCUMENTS

| | | | |
|---|---|---|---|
| 4,556,029 A * | 12/1985 | Yamaguchi et al. | 123/41.15 |
| 4,727,307 A * | 2/1988 | Kaneyuki et al. | 322/22 |
| 5,077,516 A * | 12/1991 | Meyer | 322/7 |
| 5,266,882 A * | 11/1993 | Morishita | 322/28 |
| 5,298,852 A * | 3/1994 | Meyer | 322/29 |
| 5,581,172 A * | 12/1996 | Iwatani et al. | 322/28 |
| 5,703,410 A * | 12/1997 | Maekawa | 290/40 C |
| 5,751,069 A * | 5/1998 | Rajashekara et al. | 290/40 C |
| 6,054,776 A * | 4/2000 | Sumi | 290/17 |
| 6,184,661 B1 * | 2/2001 | Becker et al. | 322/25 |
| 6,215,198 B1 * | 4/2001 | Inada et al. | 290/40 C |
| 6,278,915 B1 * | 8/2001 | Deguchi et al. | 701/22 |
| 6,346,797 B1 * | 2/2002 | Perreault et al. | 322/29 |
| 6,608,473 B1 * | 8/2003 | Beulich | 323/348 |
| 6,700,214 B1 * | 3/2004 | Ulinski et al. | 290/40 C |
| 6,737,836 B1 * | 5/2004 | Namai | 322/44 |

FOREIGN PATENT DOCUMENTS

| | | | |
|---|---|---|---|
| JP | 406269136 A * | 9/1994 | |
| JP | 11-089081 A | 3/1999 | |
| JP | 11-122997 A | 4/1999 | |
| JP | 2000-125599 | 4/2000 | |
| JP | 2000-278999 A | 10/2000 | |

* cited by examiner

*Primary Examiner*—Julio C. Gonzalez
(74) *Attorney, Agent, or Firm*—Foley & Lardner LLP

(57) ABSTRACT

A method and an apparatus for providing protection to a generator are disclosed. A reference is determined out of rated capability of the generator. Based on the reference, and field current and output conditions of the generator, there is determined a drop in generator performance due to a temperature condition of the generator. Accounting for the drop in generator performance, operation of the generator may be modified to a generator output limit mode.

15 Claims, 9 Drawing Sheets

PROTECTION OF A GENERATOR WITHOUT MEASURING TEMPERATURE

BACKGROUND OF THE INVENTION

1. Field of the Invention

The present invention relates to an apparatus or method for providing protection to a generator.

2. Description of the Background Art

A generator capability curve from a manufacture gives the generator rating at rated coolant temperature. When operating at temperatures that differ from rated, the capability of the generator may be demonstrated by other capability curves. Automobile applications are sensitive to changes in temperature conditions as the capability of a generator varies significantly with temperature conditions. In such automobile applications, ambient temperature and ventilation affect the performance of a generator as the generator operates within an engine compartment where the generator and an internal combustion engine heat ambient air. Besides, the amount of heat issued by a generator tends to increase because a need for increased electric energy has led an increase in generator capability.

In such automobile applications, air-cooled generators have traditionally been used. Within an engine compartment, the use of ambient air as coolant involves potential difficulty to keep a temperature condition of a generator within an acceptable range for normal generator operation. This has led extensive investigation of the use of liquid coolant for automobile applications. A liquid-cooled AC generator has been proposed, which is driven by an internal combustion engine and associated with a radiator and a pump. Liquid coolant is cooled at the radiator and supplied by the pump to cool the generator parts. One example of such liquid-cooled generator is shown in JP P2000-125599. According to this prior art, temperature sensors are arranged for measuring inlet temperature of liquid coolant to an AC generator and outlet temperature thereof from the generator, respectively. When a difference between measures of inlet and outlet coolant temperatures falls outside of an acceptable range for steady normal operation, operation of the generator is limited to protect it. While the prior art limiter implementation can properly protect the generator, it does not account for a temperature condition of the generator upon failure of the temperature sensors.

It is thus seen to be desirable to monitor a temperature condition of a generator without temperature sensors.

SUMMARY OF THE INVENTION

An object of the present invention is to provide a method and an apparatus for providing a protection to a generator by monitoring a temperature condition of the generator without temperature sensors.

In accordance with one exemplary embodiment of the present invention, there is provided an apparatus for providing protection to a generator, comprising:

a reference determining block having as inputs, a generator speed of the generator and a generator field current thereof, and determining out of rated capability of the generator, a reference in terms of the magnitude of generator output current; and a generator performance drop monitoring block receiving the determined reference and a measure of generator output current, calculating a difference between the determined reference and the measure, and outputting a drop in generator performance due to a temperature condition of the generator.

In accordance with another exemplary embodiment of the present invention, there is provided an apparatus for providing protection to a generator, comprising:

a reference determining block having as inputs, a measure of generator output voltage of the generator and a duty ratio of a power transistor of a field current circuit of the generator and determines a reference out of rated capability of the generator in terms of, the magnitude of generator field current; and a generator performance monitoring block receiving the reference and a measure of generator field current of the generator, calculating a ratio between the reference and the measure, and outputting a drop in generator performance due to a temperature condition of the generator.

In accordance with another aspect of the present invention, there is provided a method for providing protection to a generator, comprising:

determining a reference out of rated capability of the generator;

determining, based on the reference, and generator field current and output conditions of the generator, a drop in generator performance due to a temperature condition of the generator; and modifying operation of the generator to a generator output limit mode, accounting for the determined drop in generator performance.

BRIEF DESCRIPTION OF THE DRAWINGS

Further objects and advantages of the invention will be apparent from reading of the following description in conjunction with the accompanying drawings.

DETAILED DESCRIPTION OF THE INVENTION

Figure 1:
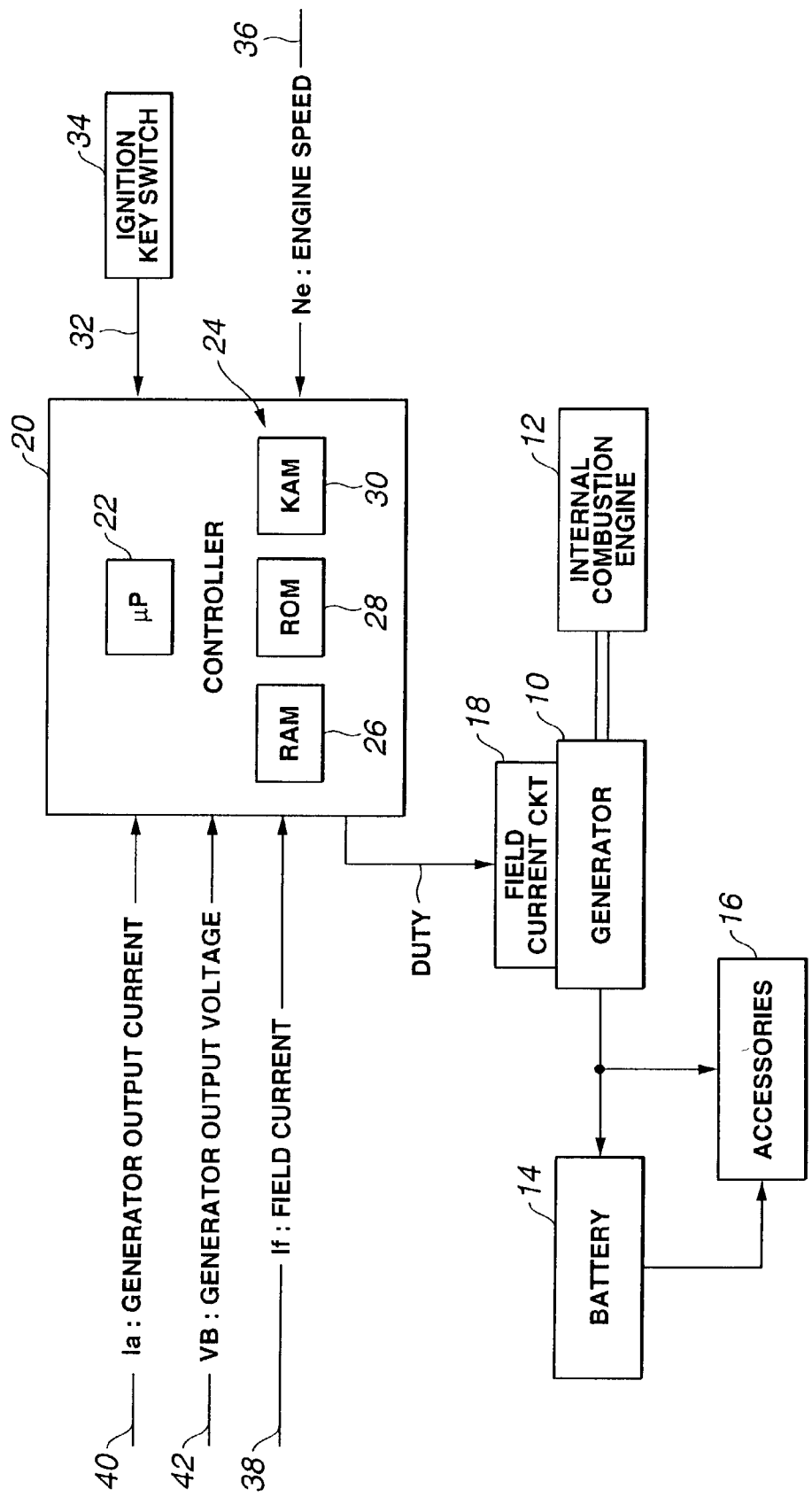
FIG. 1 is a block diagram illustrating one exemplary implementation of an apparatus or method for providing protection to a generator according to the present invention.

Referring now to the accompanying drawings, FIG. 1 shows an exemplary implementation of a method and an apparatus for providing protection to an automobile application of a generator according to the present invention. The generator 10 is drivingly coupled with an internal combustion engine 12. Pulleys and power transmitting element may be used to interconnect them. Direct coupling to the engine may be established if it is possible to use an output shaft of an engine as a rotor of a generator. Generator 10 is electrically coupled to a battery 14 and vehicle accessories 16 to provide electric electrical energy. Generator 10 includes a field current circuit 18. Field current circuit 18 is connected to a field winding of generator 10 and includes an IC generator. The IC generator includes a power transistor. The power transistor functions to regulate field current. Duty ratio of the power transistor varies responsive to a command DUTY from a controller 20. Controller 20 determines duty ratio of the power transistor and provides the command DUTY indicative of the determined duty ratio to field current circuit.

In exemplary embodiments of the present invention, controller 20 comprises a microprocessor-based controller with at least one associated microprocessor 22. Microprocessor 22 communicates with associated computer-readable storage medium 24. As will be appreciable by one of ordinary skill in the art, computer-readable storage media may include various devices for storing data representing instructions executable by the microprocessor to control the generator. For example, computer-readable storage media may include a random access memory (RAM) 26, a read-only memory (ROM) 28, and/or a keep-alive memory (KAM) 30. These functions may be performed through any one of a number of known physical devices including EPROM, EEPROM, flash memory, and the like. The present invention is not limited to a particular type of computer-readable storage medium, examples of which are provided for convenience of description only.

Without measuring temperatures of various parts or portions of generator 10, controller 20 is capable of determining a drop in generator performance due to a temperature condition of the generator. Controller 20 receives an ignition key signal 32 indicative of information as to ON/OFF state of an ignition key switch 34 and an engine speed signal 36 indicative of engine speed Ne of engine 12 to monitor engine speed after start-up and generator speed Ng. Controller 20 further receives a field current signal 38 indicative a measure of actual generator field current If. In one embodiment, controller 20 receives a generator output current signal 40 indicative of a measure of actual generator output current Ia. In another embodiment, controller 20 receives a generator output voltage signal 42 indicative of a measure of actual generator output voltage VB instead of the generator output current signal 40.

Figure 2:
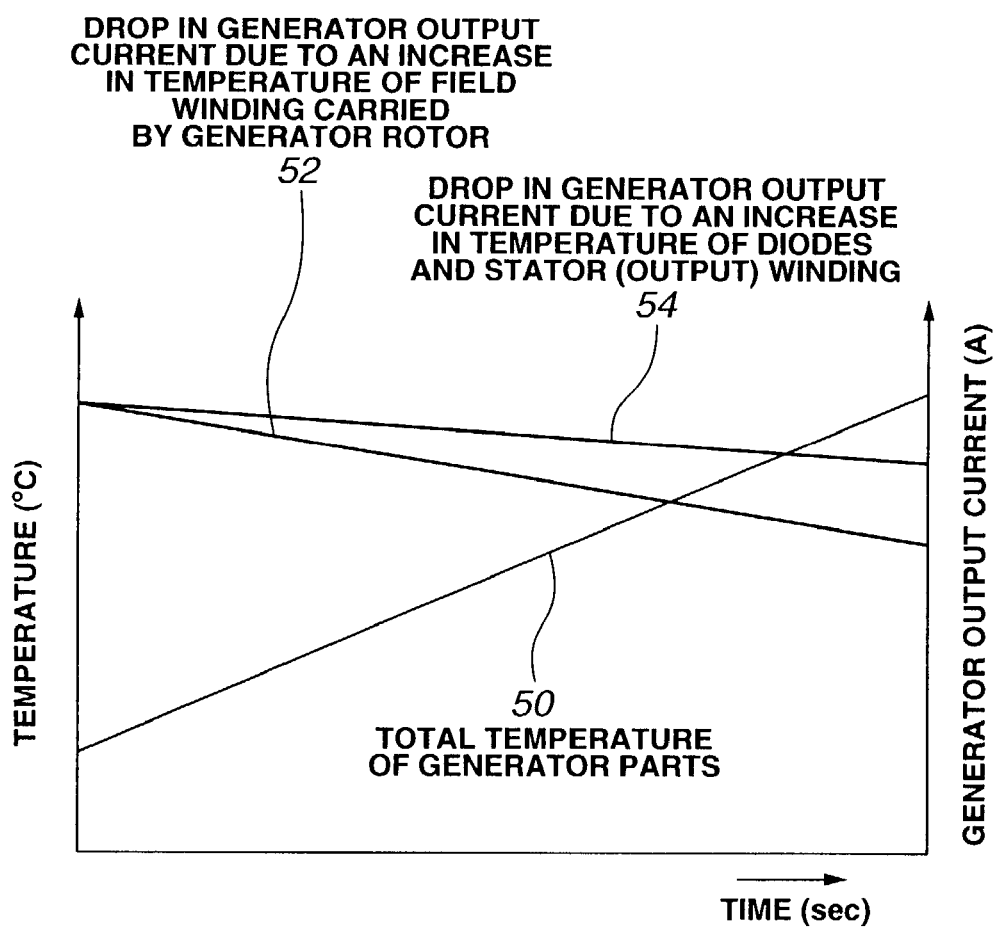
FIG. 2 illustrates a drop in generator output current due to an increase in temperature of field winding and a drop in generator output current due to an increase in temperature of diodes and stator winding in response to the elevation of total temperature of generator parts.

With reference to FIG. 2, the line 50 illustrates the elevation of total temperature of constituent parts of generator 10. The line 52 illustrates a drop in generator output current due to an increase in temperature of field winding. The other line 54 illustrates a drop in generator output current due to an increase in temperature of diodes and stator winding. The magnitude of such drops increase as the temperature of generator constituent parts is elevated. FIG. 2 clearly indicates that there occurs a drop in generator performance due to a temperature condition of the generator.

Figure 3:
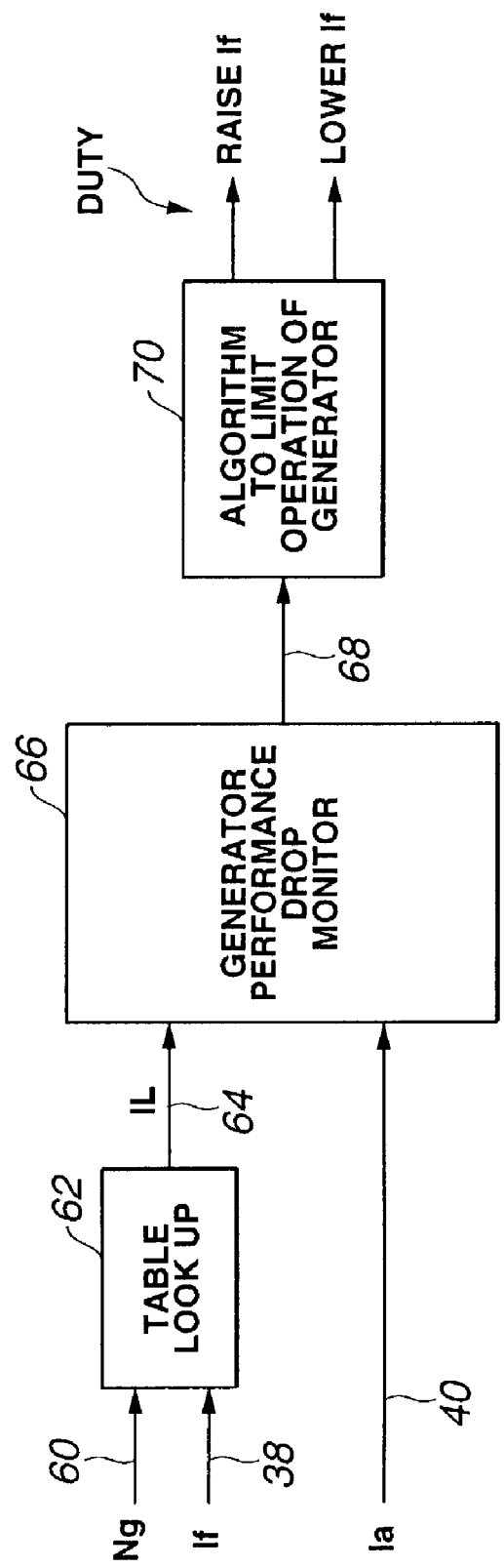
FIG. 3 is a controls diagram of an exemplary embodiment of the present invention.
Figure 4:
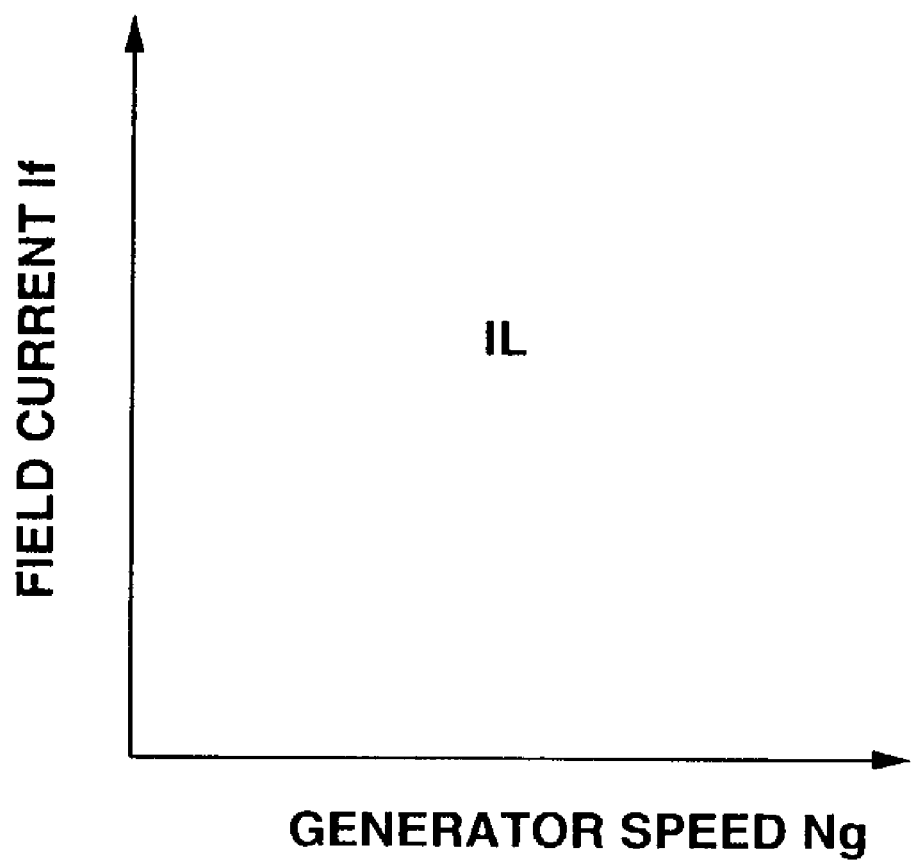
FIG. 4 illustrates a lookup table.
Figure 5:
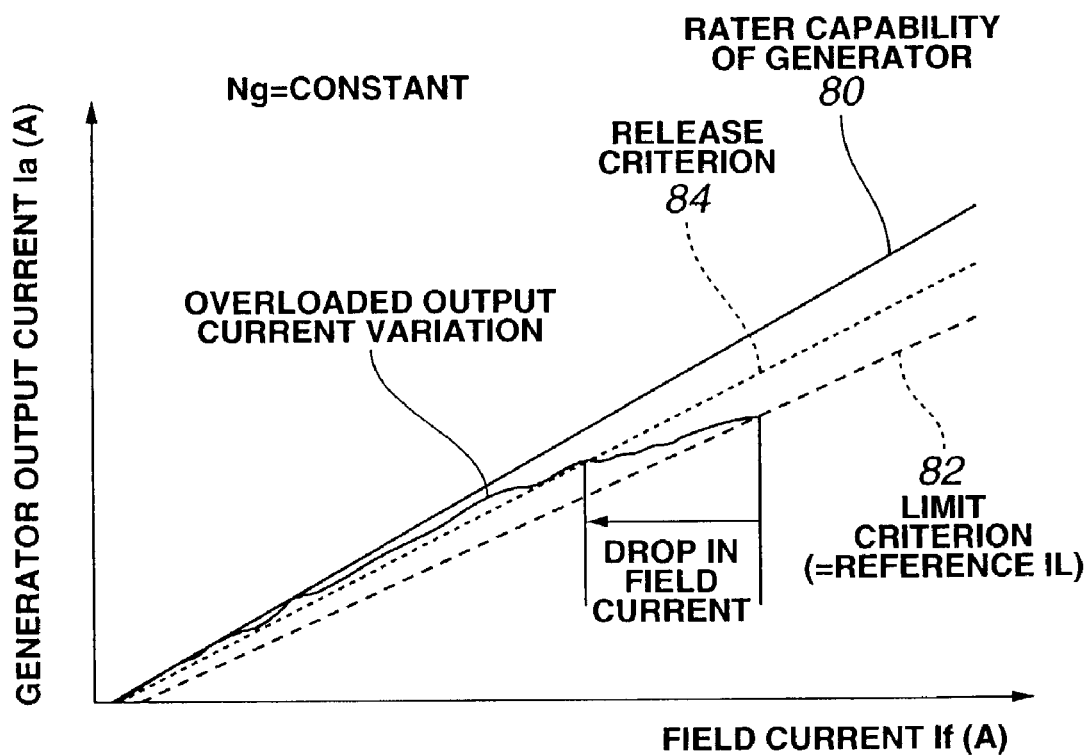
FIG. 5 illustrates rated capability of a generator and a reference or limit criterion that is determined out of the rated capability.

An exemplary embodiment of the present invention can be understood with reference to the controls diagram in FIG. 3. A generator speed signal 60 indicative of generator speed Ng is used as an input of a block 62. The generator speed Ng is calculated based on the engine speed Ne indicated by engine speed signal 36 and a speed ratio between the engine speed and the generator speed. The driving interconnection between them determines the speed ratio. Field current signal 38 is also used as an input of block 62. Block 62, which may be called a reference-determining block, determines out of rated capability of generator 10, a reference IL in terms of the magnitude of generator output current. Reference IL may be regarded as a set of data, each demonstrating the limit criterion of a deviation from the rated capability of generator 10. The rated capability is expressed in terms of generator output current, which generator 10 is capable of outputting for a given generator speed Ng and field current If condition when generator rating occurs. Preferably, such data are stored in a table as illustrated in FIG. 4 for different generator speed Ng and field current If conditions. With reference to FIG. 5, the fully drawn line 80 illustrates, with the same generator speed Ng, varying of the rated capability of generator 10 with different magnitudes of field current If. In FIG. 5, the one-dot chain line 82 illustrates reference IL indicative of limit criterion. In the embodiment, at block 62, reference IL is determined by table look up. The output 64 of block 66 indicative of the determined reference IL is used as an input of a block 66, which may be called a generator performance drop monitoring block. Generator output current signal 40, indicative of a measure of actual generator output current Ia, is also used as an input of block 66. Block 66 calculates a difference ΔI that is expressed by the following formula, $$\Delta I = Ia - IL \tag{1}$$

Block 66 determines that the deviation is acceptable when difference ΔI is not less than 0 (zero). However, block 66 determines that the deviation is not acceptable when difference ΔI is less than 0 (zero) and generates an output signal 68 indicating that there has occurred a drop in generator performance due to a temperature condition of generator 10.

In the embodiment, block 66 provides output signal 68 to a block 70, which contains algorithm or functionality to limit operation of generator 10 in response to the occurrence of the drop in generator performance. Accounting for the drop in generator performance, block 70 modifies operation of generator 10 to a generator output limit mode. Upon or after difference ΔI becoming less than 0 (zero), command DUTY is modified, at block 70, to lower field current If, causing a drop in field current as illustrated by the overloaded output current variation in FIG. 5. Such drop in field current If causes a drop in generator output current Ia, causing a reduction in temperature of generator constituent parts. The reduction in temperature eliminates or at least alleviates the overloaded state of generator 10. According to the limiting implementation, block 70 lowers field current at the rate of a fixed value per a predetermined interval till achievement of a release criterion as illustrated by the dotted line 84 in FIG. 5. As readily seen from FIG. 5, release criterion 84 is disposed within an area between rated capability 80 and reference IL. Release criterion 84 may be regarded as a set of data, each demonstrating a deviation from the rated capability 80 for a given generator speed Ng and field current If condition. This deviation is less than a deviation on reference IL or limit criterion for the same generator speed and field current condition.

It will be appreciated, as an advantage of the limiting implementation using release criterion 84, that the period of time for operation in output limit mode is minimized, extending period of time during which generator 10 is allowed to generate electricity near the rated capability.

Figure 6:
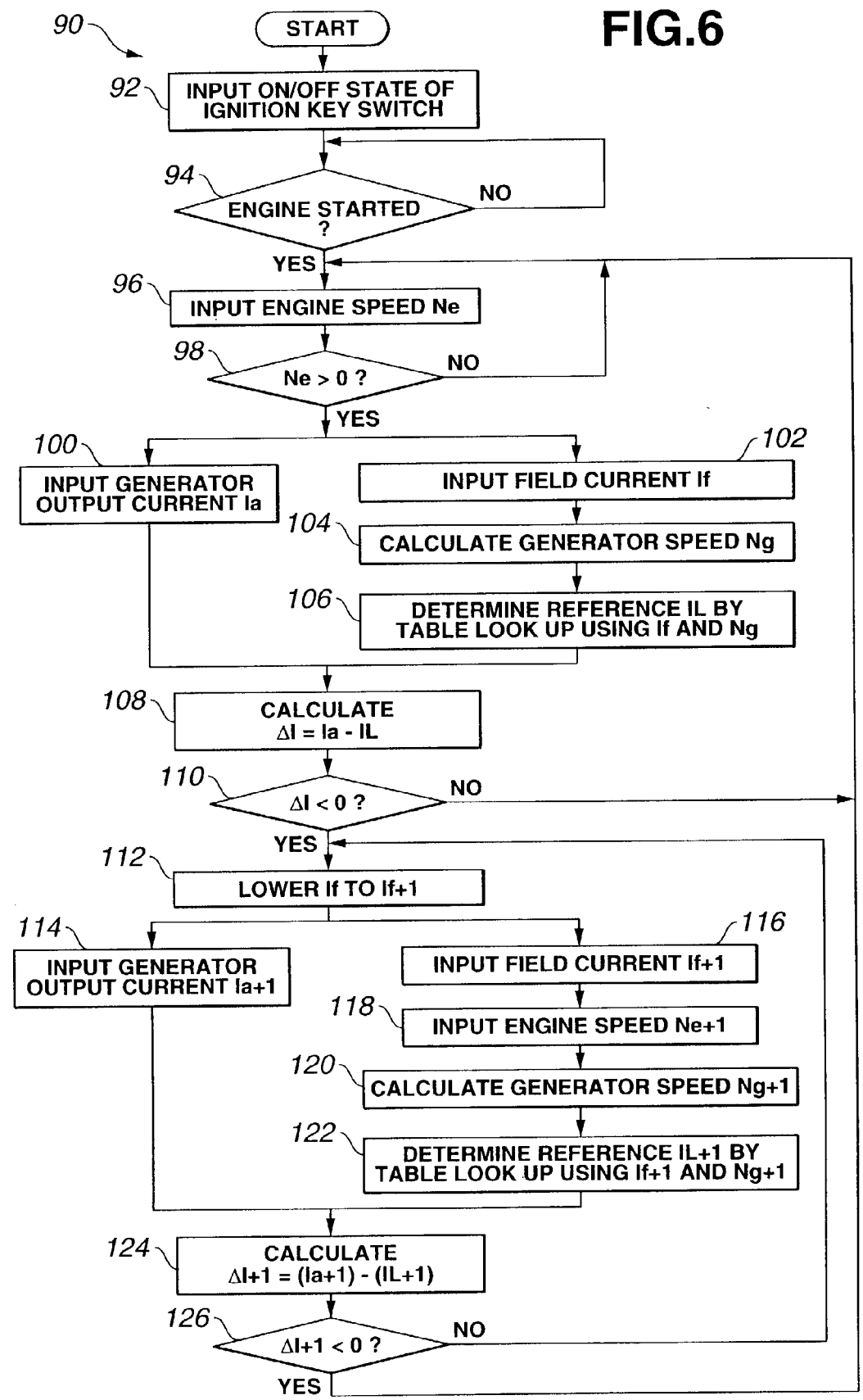
FIG. 6 is a flow diagram of a control routine for operating another exemplary embodiment of the present invention.

An example of how controller 20 would implement the present invention can be understood with reference to FIG. 6. The flow diagram in FIG. 6 illustrates a control routine, generally indicated at 90, of another exemplary embodiment of the present invention. At input box 92, the controller receives information as to ON/OFF state of ignition key switch 34 from ignition key signal 32. At interrogation box 94, the controller determines, based on ON/OFF state of the ignition key, whether or not engine 12 has started. Upon or after the determination, at box 94, that the engine has started, the control routine always proceeds to input box 96.

At box 96, the controller receives information as to engine speed Ne. At the next interrogation box 98, the controller determines whether or not engine speed Ne is greater than 0 (zero). If Ne is zero, the routine returns to box 96. Upon determination, at box 98, that engine speed Ne is greater than zero, the routine goes to boxes 100, 102, 104, 106 and 108 in this order.

In FIG. 6, box 100 and three boxes 102, 104 and 106 are connected in parallel between box 98 and box 108 for convenience of illustration only.

At input box 100, the controller receives information as to a measure of actual generator output current Ia from generator output current signal 40. At the next input box 102, the controller receives information as to field current If from filed current signal 38. At box 104, the controller calculates generator speed Ng by multiplying the engine speed Ne received at box 96 with the speed ratio between engine 12 and generator 10. At box 106, the controller determines reference IL by table look up of map illustrated in FIG. 4 using field current If and generator speed Ng. Subsequently, the routine goes to box 108.

At box 108, the controller calculates a difference ΔI that is expressed by the formula (1). At the next interrogation box 110, the controller determines whether or not difference ΔI is less than 0 (zero). As described before in connection with FIG. 5, generator 10 operates in the acceptable area when the controller determines at box 110 that difference ΔI is not less than zero. Under this condition, the routine returns to box 96 from box 110. When difference ΔI is less than zero, at box 110, the controller determines that there has occurred a drop in generator performance due to a temperature condition of generator 10. Under this condition, the routine goes to box 112 to initiate a generator output limit loop.

At box 112, the controller lowers field current from the current level If to a lower level If+1 by a fixed amount. After lowering field current at box 112, the routine goes to boxes 114, 116, 118, 120, 122 and 124 in this order.

In FIG. 6, box 114 and four boxes 116, 118, 120 and 122 are connected in parallel between box 112 and box 124 for convenience of illustration only.

At input box 114, the controller receives information as to a measure of generator output current Ia+1 upon or immediately after field current has dropped at box 112. At input box 116, the controller receives information as to field current If+1 upon or immediately after field current has dropped at box 112. At the next input box 118, the controller receives information as to engine speed Ne+1 upon or immediately after field current has dropped at box 112. At box 120, the controller calculates generator speed Ng+1 by multiplying the engine speed Ne+1 received at box 118 with the speed ratio between engine 12 and generator 10. At box 122, the controller determines reference IL+1 by table look up of map illustrated in FIG. 4 using field current If+1 and generator speed Ng+1. Subsequently, the routine goes to box 124.

At box 124, the controller calculates a difference ΔI+1 that is expressed by the following formula:

$$\Delta I+1=(Ia+1)-(IL+1) \qquad (2).$$

At the next interrogation box 126, the controller determines whether or not difference ΔI is greater than 0 (zero). As described before in connection with FIG. 5, generator 10 operates outside of the acceptable area below limit criterion 82 when the controller determines at box 126 that difference ΔI+1 is not greater than zero. Under this condition, the routine returns from box 126 to box 112 for a further drop in field current. Subsequently, when difference ΔI+1 has exceeded zero, at box 126, the controller determines that the generator 10 operates in the acceptable area above the limit criterion 82. Under this condition, the routine returns from box 126 to box 96, leaving the generator output limit loop.

Figure 7:
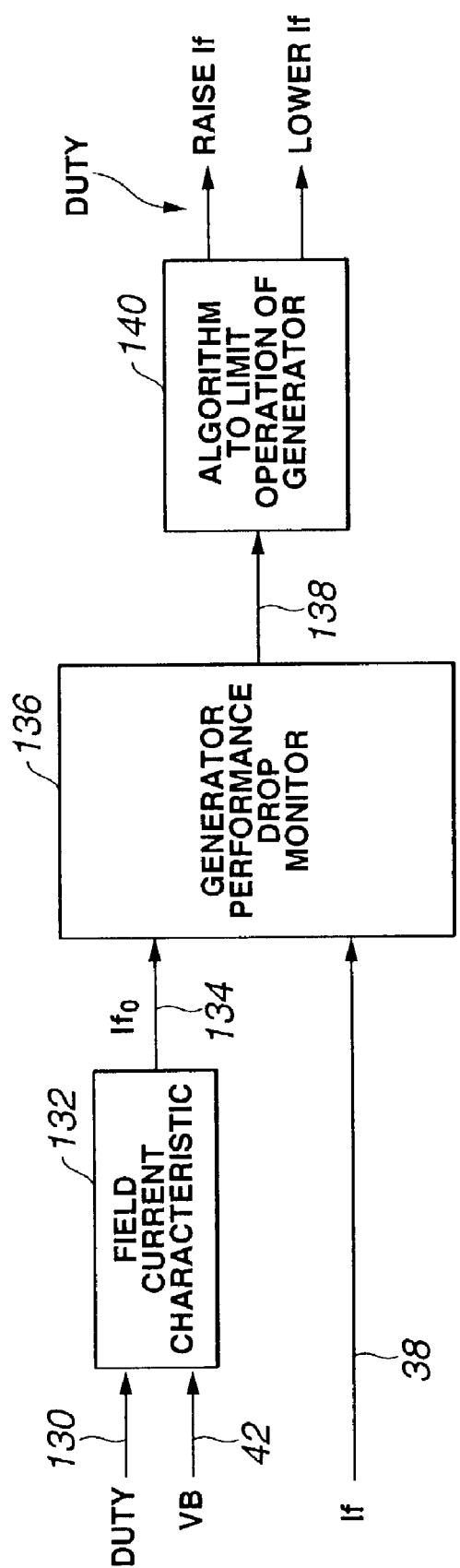
FIG. 7 is a controls diagram of a further exemplary embodiment of the present invention.
Figure 8:
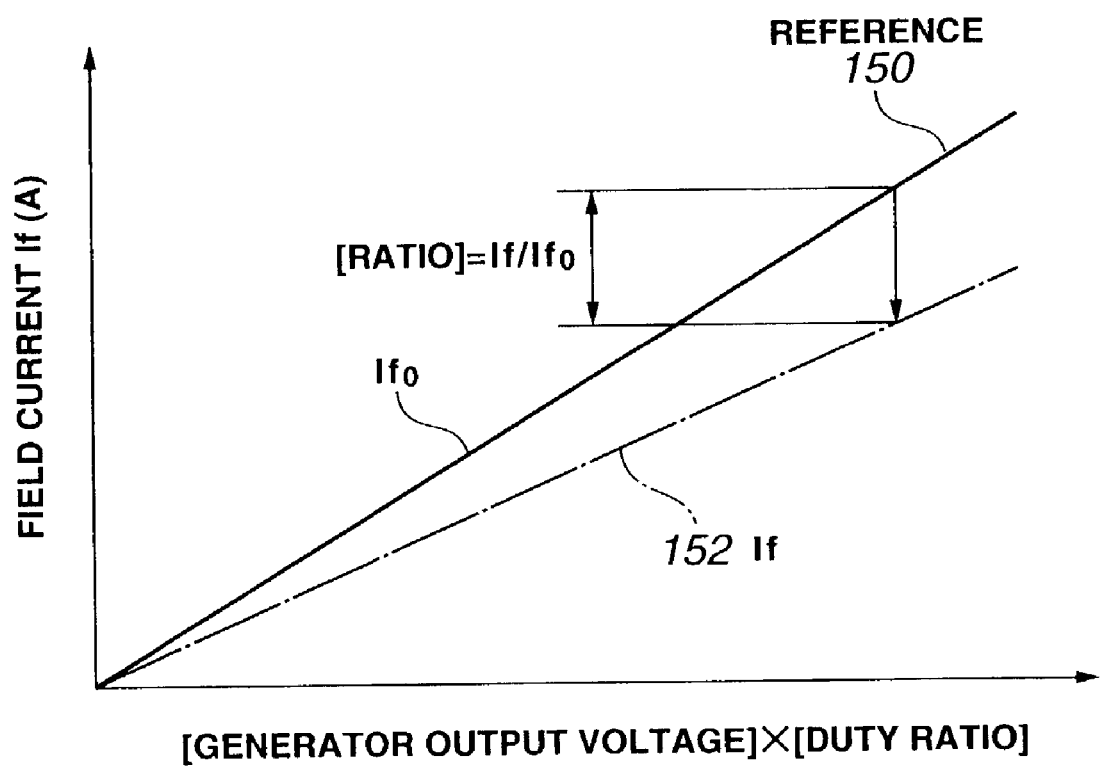
FIG. 8 illustrates a reference in terms of field current characteristic that is determined out of the rated capability.

A further exemplary embodiment of the present invention can be understood with reference to the controls diagram in FIG. 7. A duty signal 130 indicative of a duty ratio of command DUTY is used as an input of a block 132. Generator output voltage signal 42 is also used as an input of block 132. Block 132, which may be called a reference-determining block, determines out of rated capability of generator 10, a reference $If_0$ in terms of the magnitude of generator field current. Reference $If_0$ may be regarded as a set of data demonstrating a field current characteristic. With reference to FIG. 8, the fully drawn line 150 illustrates varying of field current upon occurrence of generator rating with different amounts of product [generator output voltage]×[duty ratio]. The one-dot chain line 152 illustrates one example of field current when overloaded. The output 134 of block 132 indicative of the determined reference $If_0$ is used as an input of a block 136, which may be called a generator performance drop monitoring block. Generator field current signal 38, indicative of a measure of actual generator field current Ia, is also used as an input of block 136. Block 136 calculates a ratio $If/If_0$. Block 136 determines that the deviation from reference $If_0$ is acceptable when the ratio $If/If_0$ is not less than a value K (0<K<1). However, block 136 determines that the deviation is not acceptable when ratio $If/If_0$ is less than the value K and generates an output signal 138 indicating that there has occurred a drop in generator performance due to a temperature condition of generator 10.

In the embodiment, block 136 provides output signal 138 to a block 140, which contains algorithm or functionality to limit operation of generator 10 in response to the occurrence of the drop in generator performance. Similarly to block 70 in FIG. 3, block 140 modifies operation of generator 10 to a generator output limit mode. Upon or after ratio $If/If_0$ becoming less than the value K, command DUTY is modified, at block 140, to lower field current If, causing a drop in field current. Such drop in field current If causes a drop in generator output current Ia, causing a reduction in temperature of generator constituent parts. The reduction in temperature eliminates or at least alleviates the overloaded state of generator 10. According to the limiting implementation, block 140 lowers field current at the rate of a fixed value per a predetermined interval till achievement of a release criterion.

Figure 9:
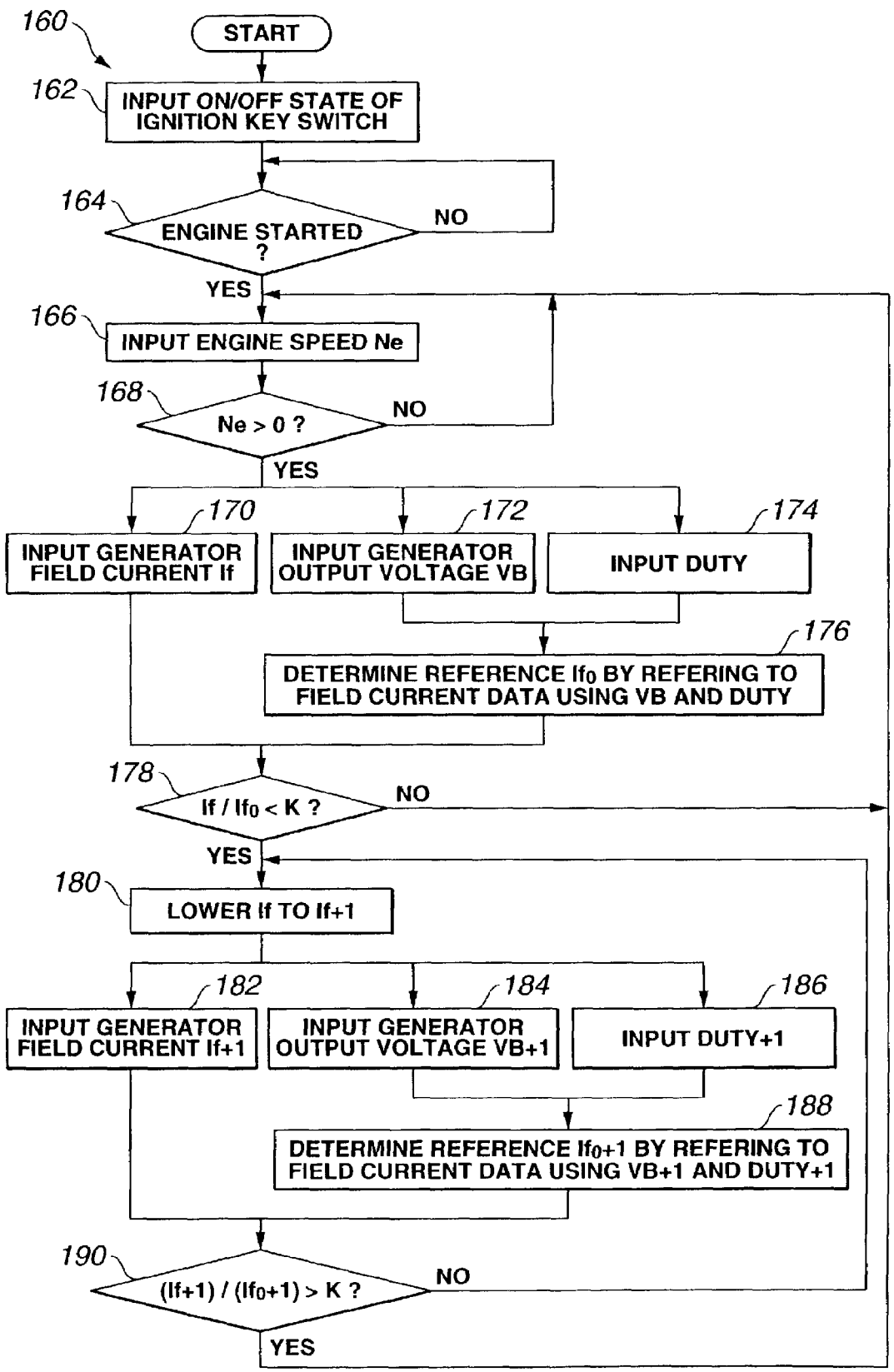
FIG. 9 is a flow diagram of a control routine for operating other exemplary embodiment of the present invention.

Anther example of how controller 20 would implement the present invention can be understood with reference to FIG. 9. The flow diagram in FIG. 9 illustrates a control routine, generally indicated at 160, of other exemplary embodiment of the present invention. At input box 162, the controller receives information as to ON/OFF state of ignition key switch 34 from ignition key signal 32. At interrogation box 164, the controller determines, based on ON/OFF state of the ignition key, whether or not engine 12 has started. Upon or after the determination, at box 164, that the engine has started, the control routine always proceeds to input box 166.

At box 166, the controller receives information as to engine speed Ne. At the next interrogation box 168, the controller determines whether or not engine speed Ne is greater than 0 (zero). If Ne is zero, the routine returns to box 166. Upon determination, at box 168, that engine speed Ne is greater than zero, the routine goes to boxes 170, 172, 174, 176 and 178 in this order.

In FIG. 9, box 170 and three boxes 172, 174 and 176 are connected in parallel between box 168 and box 178 for convenience of illustration only.

At input box 170, the controller receives information as to a measure of actual generator field current If from generator field current signal 38. At the next input box 172, the controller receives information as to generator output voltage VB from generator output voltage signal 42. At input box 174, the controller receives information as to duty ratio DUTY of the power transistor from command signal DUTY. At box 176, the controller determines reference $If_0$ by referring to the field current characteristic 150 in FIG. 8 using a product of generator output voltage VB and duty ratio DUTY. Subsequently, the routine goes to box 178.

At interrogation box 178, the controller determines whether or not difference ratio $If/If_0$ is less than a value K ($0<K<1$). The controller determines that generator 10 operates in an acceptable area when ratio $If/If_0$ is not less than the value K. Under this condition, the routine returns to box 166 from box 178. When ratio $If/If_0$ is less than zero, at box 178, the controller determines that there has occurred a drop in generator performance due to a temperature condition of generator 10. Under this condition, the routine goes to box 180 to initiate a generator output limit loop.

At box 180, the controller lowers field current from the current level If to a lower level If+1 by a fixed amount. After lowering field current at box 178, the routine goes to boxes 182, 184, 186, 188 and 190 in this order.

In FIG. 9, box 182 and three boxes 184, 186 and 188 are connected in parallel between box 180 and box 190 for convenience of illustration only.

At input box 114, the controller receives information as to a measure of generator field current If+1 upon or immediately after field current has dropped at box 180. At input box 184, the controller receives information as to generator output voltage VB+1 upon or immediately after field current has dropped at box 180. At the next input box 186, the controller receives information as to duty ratio DUTY+1 upon or immediately after field current has dropped at box 112. At box 188, the controller determines reference $If_0$+1 by referring to the field current characteristic 150 in FIG. 8 using a product of generator output voltage VB+1 and duty ratio DUTY+1. Subsequently, the routine goes to box 190

At interrogation box 190, the controller determines whether or not a ratio (If+1)/($If_0$+1) is greater than the value K. The controller determines that generator 1 0 operates outside of the acceptable upon determination that ratio (If+1)/($If_0$+1) is not greater than K. Under this condition, the routine returns from box 190 to box 180 for a further drop in field current. Subsequently, when ratio (If+1)/($If_0$+1) has exceeded K, at box 190, the controller determines that the generator 10 operates in the acceptable area. Under this condition, the routine returns from box 190 to box 166, leaving the generator output limit loop.

In connection with the preceding description on various embodiments, it is to be noted that the present invention is not limited to a particular software or hardware implementation of limiting operation of a generator.

While the present invention has been particularly described, in conjunction with exemplary embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

This application claims the priority of Japanese Patent Applications No. P2001-270513, filed Sep. 6, 2001, the disclosure of which is hereby incorporated by reference in its entirety.

What is claimed is:

1. A method for providing protection to a generator, comprising:
   determining a reference out of rated capability of the generator;
   determining, based on the reference, and generator field current and output conditions of the generator, a drop in generator performance without measuring a temperature of the generator;
   modifying operation of the generator to a generator output limit mode, accounting for the determined drop in generator performance,
   wherein the step of determining a drop in generator performance comprises a comparison based on the reference, the generator field current, and the output conditions of the generator, and wherein the drop in generator performance is determined based on the comparison;
   measuring a generator output current of the generator to monitor the output condition of the generator; and
   determining a generator speed of the generator,
   wherein the determining a reference out of rated capability of the generator includes determining a magnitude of the generator output current as a function of the generator speed and the generator field current and setting the reference to the determined magnitude of the generator output current; and
   wherein the determining a generator speed of the generator includes monitoring an engine speed of an engine drivingly coupled to the generator and multiplying the monitored engine speed by a speed ratio between the engine and the generator.

2. The method as claimed in claim 1, wherein the determining the magnitude of generator output current as a function of the generator speed and the generator field current includes table look up to find the magnitude of the generator output current for the generator speed and the generator field current.

3. The method as claimed in claim 2, wherein the modifying operation of the generator includes lowering the field current till achievement of a predetermined release criterion.

4. The method as claimed in claim 3, wherein the determining a drop in generator performance includes calculating a difference between the generator output current and the reference.

5. A method for providing protection to a generator, comprising:
   determining a reference out of rated capability of the generator;
   determining, based on the reference, and generator field current and output conditions of the generator, a drop in generator performance without measuring a temperature of the generator;
   modifying operation of the generator to a generator output limit mode, accounting for the determined drop in generator performance, wherein the step of determining a drop in generator performance comprises a comparison based on the reference, the generator field current, and the output conditions of the generator, and wherein the drop in generator performance is determined based on the comparison;

measuring a generator output voltage to monitor the output condition of the generator; and monitoring duty ratio of a transistor of a field current circuit provided for regulating field current in the generator, wherein the determining a reference out of rated capability of the generator includes determining the magnitude of the generator field current as a function of the generator output voltage and the monitored duty ratio and setting the reference to the determined magnitude of the generator field current.

6. The method as claimed in claim 5, wherein the modifying operation of the generator includes lowering the generator field current till achievement of a predetermined release criterion.

7. The method as claimed in claim 6, wherein the determining a drop in generator performance includes calculating a ratio between the measured field current and the reference.

8. An apparatus for providing protection to a generator, comprising:

means for determining a reference out of rated capability of the generator;

means for determining, based on the reference, and generator field current and output conditions of the generator, a drop in generator performance without measuring a temperature of the generator;

means for modifying operation of the generator to a generator output limit mode, accounting for the determined drop in generator performance, wherein the means for determining a drop in generator performance comprises means for performing a comparison based on the reference, the generator field current, and the output conditions of the generator, wherein the drop in generator performance is determined based on the comparison;

wherein the output condition of the generator is monitored by a measure of a generator output current of the generator; and wherein the apparatus is operable with a generator drivingly coupled with an internal combustion engine; and further comprising means for receiving an engine speed of the engine and means for multiplying the engine speed by a speed ratio between the engine and the generator.

9. The apparatus as claimed in claim 8, wherein the means for determining a reference out of rated capability of the generator includes means for determining the magnitude of the generator output current as a function of the generator speed and the generator field current and means for setting the reference to the determined magnitude of generator output current.

10. The apparatus as claimed in claim 8, wherein the means for determining a reference out of rated capability of the generator includes means for determining the magnitude of the generator field current as a function of the generator output voltage and the duty ratio of the power transistor and means for setting the reference to the determined magnitude of the generator field current.

11. An apparatus for providing protection to a generator without measuring a temperature of the generator, comprising:

a reference determining block having as inputs, a generator speed of the generator and a generator field current thereof, and determining out of rated capability of the generator, a reference in terms of the magnitude of generator output current; and a generator performance drop monitoring block receiving the determined reference and a measure of generator output current, calculating one of a difference and a ratio between the determined reference and the measure, comparing the calculated one of the difference and the ratio to a predetermined value, and outputting a drop in generator performance without measuring a temperature of the generator when the comparing result indicates that the calculated one of the difference and the ratio is less than the predetermined value.

12. The apparatus as claimed in claim 11, wherein the apparatus is operable with a generator drivingly coupled with an internal combustion engine.

13. The apparatus as claimed in claim 12, further comprising means for determining the generator speed by multiplying a measure of engine speed of the engine by a speed ratio between the engine and the generator.

14. The apparatus as claimed in claim 11, wherein the reference determining block determines the reference by table look up using the generator speed and the generator field current.

15. The apparatus as claimed in claim 11, further comprising algorithm to limit operation of the generator in response to the drop in generator performance such that operation of the generator is limited till achievement of a predetermined release criterion.

* * * * *